(12) United States Patent
Eytchison et al.

(10) Patent No.: US 6,439,088 B1
(45) Date of Patent: Aug. 27, 2002

(54) RECONFIGURABLE VEGETATION TRIMMER AND METHOD OF USE

(75) Inventors: Gregory B. Eytchison, South Euclid; John Mark Buber, Middlefield; Robert C. Johnson, Montville, all of OH (US); Jeffrey E. Zander, Minnetonka, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 09/557,565

(22) Filed: Apr. 25, 2000

(51) Int. Cl.⁷ .................. A01D 42/00; A01D 34/46; A01D 34/67
(52) U.S. Cl. .................. 83/13; 30/122; 30/276; 30/DIG. 5; 172/14; 56/DIG. 18; 56/12.7
(58) Field of Search .................. 30/276, DIG. 5, 30/122; 56/12.7, 295, DIG. 18; 172/13, 14; 83/13

(56) References Cited

U.S. PATENT DOCUMENTS 2,832,184 A * 4/1958 Beuerle
3,221,481 A   12/1965 Mattson et al.
3,330,102 A    7/1967 Shuman, Jr.

(List continued on next page.)

FOREIGN PATENT DOCUMENTS

EP      296 789 B1      12/1988

OTHER PUBLICATIONS

Black & Decker model CST2000, Drawings labeled A–C, 1 page (date unknown).
Black & Decker model GH400, Drawings labeled A–C, 1page (date unknown).

*Primary Examiner*—Boyer Ashley
*Assistant Examiner*—Thomas J Druan, Jr.
(74) *Attorney, Agent, or Firm*—Mueting, Raasch & Gebhardt, P.A.

(57) ABSTRACT

Vegetation trimmers and methods for reconfiguring a trimmer are provided. A coupling mechanism permits reconfiguration of the trimmer between a first, e.g., trimming, configuration and a second, e.g., edging, configuration. The coupling mechanism may, in one embodiment, be used to couple a handle assembly with an extension tube. By rotating the handle assembly relative to the extension tube, the trimmer is moved between the trimming and edging configurations. In one embodiment, the mechanism may apply a biasing force to the handle assembly relative to the extension tube. The biasing force tends to bias the trimmer towards and retain the trimmer in the desired configuration. To switch the trimmer between configurations, the operator may impart a twisting force between the handle assembly and the extension tube where the twisting force is sufficient to overcome the biasing force. Optionally, a longitudinal force may also be applied before or during the application of the twisting force.

22 Claims, 6 Drawing Sheets

U.S. PATENT DOCUMENTS

| | | |
|---|---|---|
| 3,561,199 A | 2/1971 | Lay |
| 3,803,819 A | 4/1974 | Ehrlich |
| 4,043,101 A | 8/1977 | Lahr et al. |
| 4,052,789 A | 10/1977 | Ballas, Sr. |
| 4,062,114 A * | 12/1977 | Luick .......................... 30/276 |
| 4,134,204 A | 1/1979 | Perdue |
| 4,156,967 A | 6/1979 | Ballas, Sr. |
| 4,268,964 A | 5/1981 | Moore |
| 4,282,652 A * | 8/1981 | Ballas, Sr. ................... 30/276 |
| 4,360,971 A | 11/1982 | Fellmann |
| 4,505,040 A | 3/1985 | Everts |
| 4,603,478 A | 8/1986 | Anderson |
| 4,607,431 A | 8/1986 | Gay |
| 4,761,939 A | 8/1988 | Zerrer |
| 4,875,879 A | 10/1989 | Bunyea et al. |
| 4,894,914 A * | 1/1990 | Mead .......................... 30/276 |
| 5,063,673 A | 11/1991 | Webster |
| D351,768 S | 10/1994 | Griffin |
| D354,892 S | 1/1995 | Griffin |
| 5,446,964 A | 9/1995 | Woods et al. |
| 5,560,108 A | 10/1996 | Wilson |
| 5,594,990 A | 1/1997 | Brant et al. |
| D380,129 S | 6/1997 | Meisner et al. |
| 5,634,322 A | 6/1997 | Woods et al. |
| D382,450 S | 8/1997 | Meisner et al. |
| 5,662,428 A | 9/1997 | Wilson |
| 5,669,101 A * | 9/1997 | Aiyama et al. ............... 30/276 |
| 5,697,258 A | 12/1997 | Aiyama |
| 5,778,649 A | 7/1998 | Losdahl et al. |
| D398,817 S | 9/1998 | Meisner et al. |
| 5,809,653 A | 9/1998 | Everts et al. |
| 5,815,928 A | 10/1998 | Cline |
| 5,867,911 A | 2/1999 | Yates et al. |
| 5,933,966 A | 8/1999 | Yates et al. |

\* cited by examiner

ND METHOD OF USE

RECONFIGURABLE VEGETATION TRIMMER AND METHOD OF USE

TECHNICAL FIELD

The present invention relates to vegetation trimmers. More particularly, the present invention pertains to hand-held, electric string trimmers having a coupling mechanism that permits the trimmer to be configured in either a trimming configuration or an edging configuration.

BACKGROUND

Hand-held vegetation trimmers are generally known in the art. While these devices may incorporate a variety of cutting elements, perhaps the most popular are string trimmers, i.e., those which utilize a filament line or string as the cutting member.

Although string trimmers are available with a variety of power sources ranging from internal combustion engines to cordless, battery-powered electric motors, it is the plug-in (i.e., corded) variety electric string trimmer that has grown in popularity in recent years. This is primarily attributable to its lightweight construction, ease of operation, and relative low cost.

Electric string trimmers generally include a cutting unit assembly that houses an electric motor. Coupled to the electric motor is a rotatable cutting head having a length of cutting line protruding therefrom. During operation, the cutting head rotates and the cutting line stiffens sufficiently to sever ground-growing vegetation such as grass, weeds, etc.

The cutting unit assembly is typically connected to a handle assembly which incorporates the operator controls and the remote electrical interconnection (e.g., a 120 VAC electrical plug). Preferably, the handle assembly has an ergonomic design which allows the operator to comfortably support and maneuver the trimmer during operation. Lastly, an extension tube assembly is typically provided between the handle assembly and the cutting unit assembly to provide the desired reach therebetween. The handle assembly often includes a secondary handle to accommodate the operator's second hand. Alternatively, the secondary handle may be attached to the extension tube assembly.

It is advantageous to utilize string trimmers in both a trimming configuration and an edging configuration. In the trimming configuration, the cutting unit assembly is oriented relative to the handle assembly to accommodate comfortable manipulation of the cutting unit for horizontal cutting, e.g., where the axis of the cutting head is vertical. In the edging configuration, the cutting unit assembly is rotated relative to the handle assembly to better accommodate vertical cutting, e.g., where the axis of the cutting head is horizontal.

Trimmers that accommodate this relative motion are known. For instance, some trimmers having cutting unit assemblies that rotate relative to the extension tube. However, these trimmers typically require the operator to grasp or otherwise manually manipulate the cutting unit assembly to change the trimmer configuration. These devices further require the additional step of manually unlocking an index mechanism, e.g., a push-button, lever, or the like, prior to manipulation. While effective, having to grasp or otherwise manually manipulate the cutting unit assembly and unlock the index mechanism is inconvenient.

SUMMARY

The present invention provides a vegetation trimmer that is conveniently manipulable between a trimming configuration and an edging configuration. More particularly, the present invention provides a trimmer that may be manipulated between the two configurations by application of a twisting force and optionally a pulling force applied between the handle assembly and the extension tube. Trimmers according the present invention further provide a biasing force that tends to both assist the trimmer towards and retain the trimmer in either the trimming or edging configuration. In embodiments where a secondary handle is provided and tightly coupled to the extension tube, the trimmer may be manipulated between the trimming and edging configurations by simply twisting the secondary handle relative to the handle assembly. In another embodiment, the handle assembly may be longitudinally displaced, relative to the extension tube, prior to or during twisting. The longitudinal displacing force may also be applied between the handle assembly and the secondary handle.

In one embodiment, a vegetation trimmer is provided including a cutting unit assembly and a handle assembly. An extension tube having a first end coupled to the handle assembly and a second end coupled to the cutting unit assembly is also included. A coupling mechanism is also provided. The coupling mechanism is adapted to rotationally bias the handle assembly relative to the cutting unit assembly towards either a first position or a second position wherein the first position corresponds to a trimming configuration and the second position corresponds to an edging configuration.

In another embodiment, a vegetation trimmer is provided wherein the trimmer is adapted for use in either a trimming configuration or an edging configuration. The trimmer includes a cutting unit assembly and a handle assembly. The trimmer further includes an extension tube having a first end coupled to the handle assembly and a second end coupled to the cutting unit assembly, and a coupling mechanism for coupling the first end of the extension tube to the handle assembly. The coupling mechanism includes: a cam member wherein the cam member defines a cam surface; a cam follower for moving along the cam surface; and a biasing member for biasing the cam surface against the cam follower. The coupling mechanism is adapted to allow the handle assembly to be selectively rotated relative to the extension tube by application of a twisting force.

In yet another embodiment, a method for reconfiguring a vegetation trimmer between a trimming configuration and an edging configuration is provided. The method includes providing a vegetation trimmer where the vegetation trimmer has a cutting unit assembly and a handle assembly. The handle assembly is adapted to receive a first hand of an operator. The trimmer further included an extension tube assembly having a first end coupled to the handle assembly and a second end coupled to the cutting unit assembly, wherein the extension tube assembly is adapted to receive a second hand of the operator. A coupling mechanism is also included with the trimmer wherein the coupling mechanism couples the first end of the extension tube assembly to the handle assembly. The coupling mechanism is further adapted to rotationally bias the handle assembly relative to the extension tube assembly to either a first position or a second position, the first position corresponding to the trimming configuration and the second position corresponding to the edging configuration. The method further includes applying a twisting force between the handle assembly and the extension tube assembly whereby the handle assembly rotates about the extension tube assembly between the first position and the second position.

BRIEF DESCRIPTION OF THE DRAWINGS

The present invention will be further described with reference to the drawings, wherein.

DETAILED DESCRIPTION OF EXEMPLARY EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
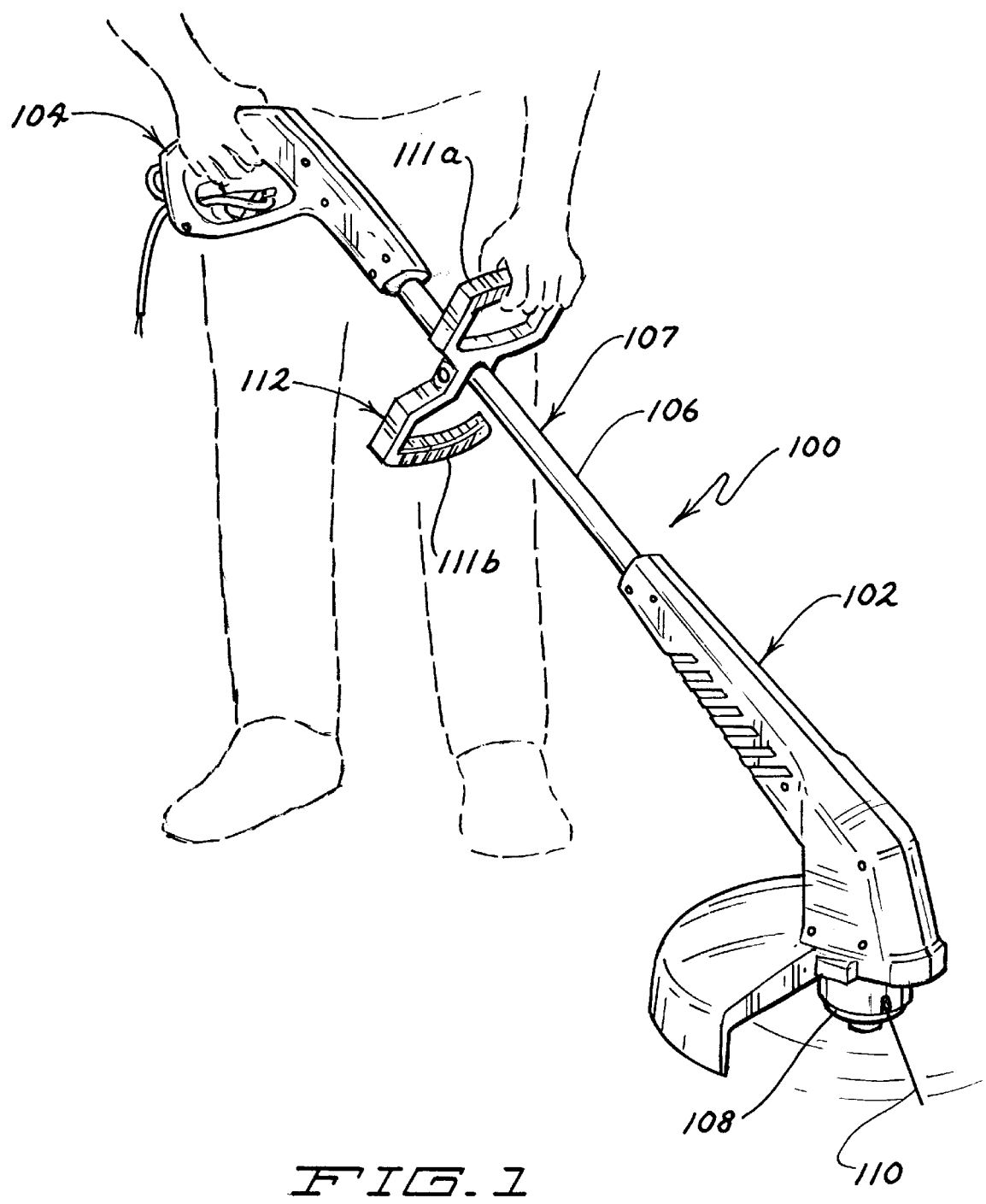
FIG. 1 is a perspective view of a vegetation trimmer in accordance with one exemplary embodiment of the invention, the trimmer shown in a trimming configuration.

FIG. 1 shows a vegetation trimmer 100 in accordance with one exemplary embodiment of the invention. It is noted that, throughout the following description and accompanying figures, the invention is described in terms of a corded, electric string trimmer 100. However, this embodiment is intended to be exemplary only. The invention is equally applicable to other types of vegetation trimmers, e.g., cordless and gasoline-powered string trimmers, or, for that matter, to most any multi-positionable garden implement.

Still referring to FIG. 1, the trimmer 100 may include a cutting unit assembly 102 and a handle assembly 104 with an extension tube 106 extending therebetween. The cutting unit assembly 102 includes a cutting head 108 operatively coupled to an electric motor (not shown). During operation, the cutting head 108 rotates at speeds sufficient to cause a length of cutting line 110 extending therefrom to stiffen. The stiffened cutting line 110 is then used to sever vegetation such as grass, weeds, etc.

The trimmer 100 is ideally configurable and operable in either of two configurations. In a trimming configuration, the trimmer 100 may be positioned such that the cutting line 110 rotates within a generally horizontal plane, i.e., the axis of the cutting head 108 is oriented generally vertically (see FIG. 1). In this mode, the handle assembly 104 is positioned relative to the cutting unit assembly 102 such that the trimmer 100 may be comfortably held when trimming around obstacles such as trees, shrubs, fences, and the like. In an edging configuration (see FIG. 4), the trimmer 100 may be positioned such that the cutting line 110 rotates within a generally vertical plane, i.e., the axis of the cutting head 108 is oriented generally horizontally. In this configuration, the handle assembly 104 is positioned relative to the cutting unit assembly 102 so that the trimmer 100 may be comfortably held when edging around boundaries such as walkways, driveways, curbs, and the like.

Figure 4:
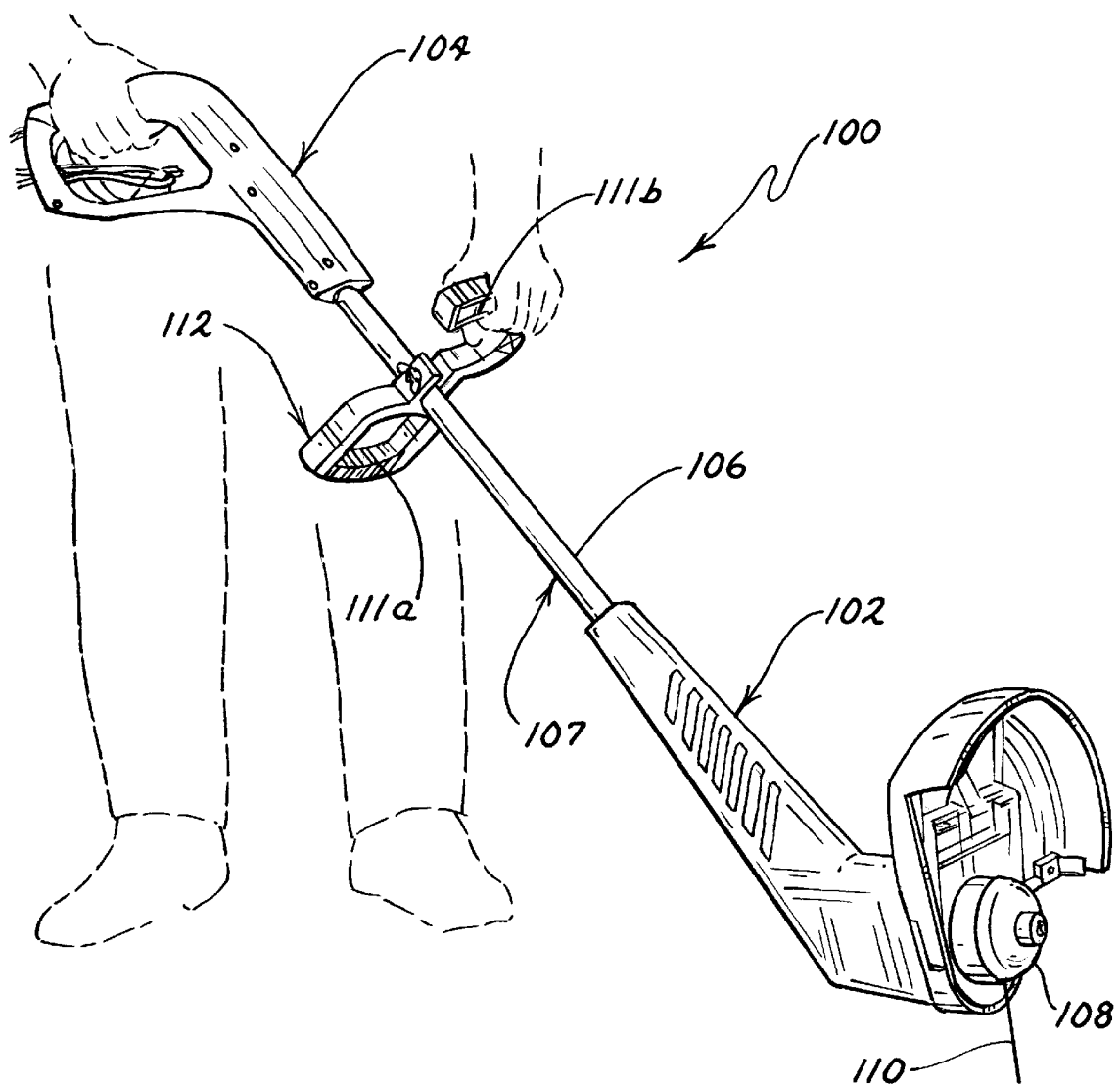
FIG. 4 is a perspective view of the vegetation trimmer of FIG. 1 shown after manipulation into the edging configuration.

A secondary handle 112 designed to be gripped by the operator's second hand when the trimmer 100 is in either the trimming or edging configuration, as shown in FIGS. 1 and 4 respectively, may also be included. The secondary handle 112 is preferably securely coupled, e.g., clamped, to the extension tube 106. The extension tube assembly 107 includes the extension tube 106 as well as the secondary handle 112.

While the trimmer 100 may simply be held in the desired edging or trimming configuration, it is generally perceived that orienting the handle assembly 104 for comfortable operation in the trimming configuration yields a trimmer that is somewhat awkward for use as an edging device and vice-versa. That is, if the handle assembly is positioned for comfortable operation during trimming, it is generally considered to be less than desirable for edging. Thus, the present invention provides a string trimmer 100 wherein the handle assembly 104 and cutting unit assembly 102 may be repositioned relative to one another to provide comfortable and convenient gripping in both the trimming and edging configurations. To provide this versatility, a coupling mechanism 200 (discussed below with respect to FIGS. 5–9) in accordance with the present invention is provided. In one embodiment, the mechanism 200 may be used to couple the extension tube 106 to the handle assembly 104. However, embodiments where the mechanism 200 is elsewhere located, e.g., at another location along the extension tube 106, are also possible.

FIG. 1 illustrates the trimmer 100 as configured in the trimming configuration. As shown, the operator may hold the trimmer with a first hand on the handle assembly 104 and a second hand on a first gripping portion 111a of the secondary handle 112. The secondary handle 112 preferably has a figure "8" shape having a second gripping portion 111b. The advantages of this handle design will become apparent below.

Figure 3:
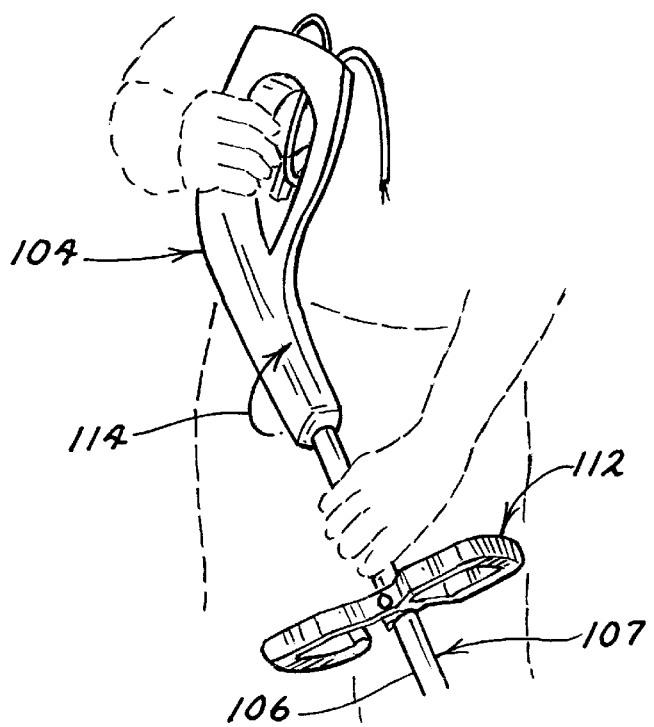
FIG. 3 is a partial perspective view of the vegetation trimmer of FIG. 1 illustrating operator manipulation of the handle assembly in accordance with another embodiment of the invention.

FIG. 3 shows the trimmer 100 as it undergoes manipulation between the trimming configuration as shown in FIG. 1 and the edging configuration as shown in FIG. 4. In one embodiment, the operator merely imparts a torque, e.g., a twisting force, to rotate the handle assembly 104 in the direction 114 relative to the extension tube 106, e.g., about the centerline of the extension tube 106. To return the trimmer to the trimming configuration, a twisting force in a direction opposite the direction 114 is imparted. Where the secondary handle 112 is secured to the extension tube 106, the twisting force may be imparted by gripping the secondary handle 112 rather than the extension tube 106.

Figure 2:
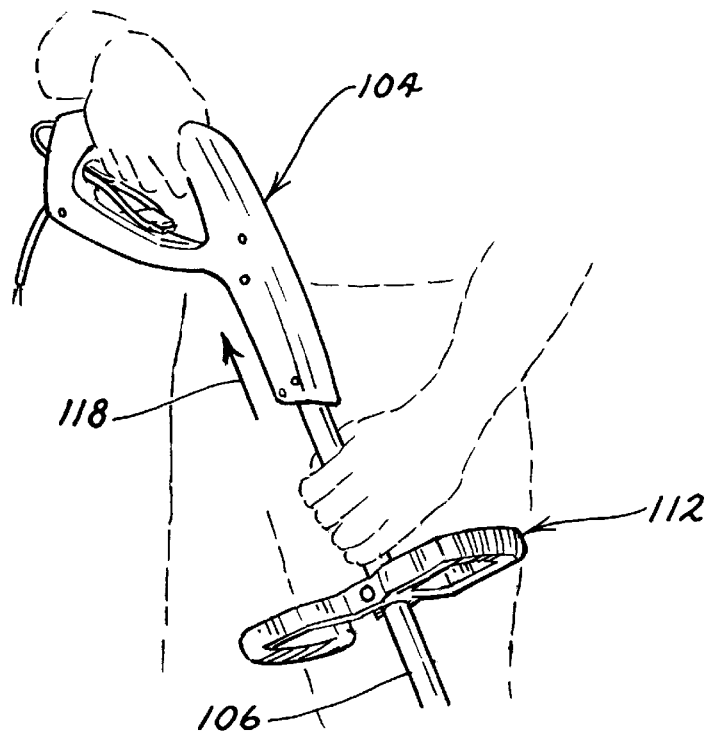
FIG. 2 is a partial perspective view of the vegetation trimmer of FIG. 1 illustrating operator manipulation of the handle assembly in accordance with one embodiment of the invention.

When the twisting force is sufficient to overcome the bias maintaining the handle assembly 104 and the extension tube 106 in the trimming configuration, the handle assembly 104 begins to rotate about the extension tube 106. Stop members (further discussed below) may be used to prevent overrotation. In some embodiments, the coupling mechanism 200 may require application of a longitudinal force, e.g., in the longitudinal direction 118 (see FIG. 2), before or during application of the twisting force. "Longitudinal direction" is used herein to refer to a direction generally parallel to the centerline of the extension tube 106. Accordingly, operator-applied forces include one or more forces selectively applied to the trimmer 100 to position it in the desired configuration. These forces may include twisting forces, e.g., in the direction 114 (see FIG. 3), and longitudinal forces, e.g., in the direction 118 (see FIG. 2).

It is noted that the directions 114 (see FIG. 3) and 118 (see FIG. 2) are exemplary only. The actual directions 114 and 118 may be selected to provide more convenient operation or to better suit the particular configuration of the coupling mechanism 200.

In the embodiments illustrated, the transition of the trimmer 100 between the trimming configuration and the edging configuration is achieved by rotating the handle assembly 104 between a first position (see FIG. 1) corresponding to the trimming configuration and a second position (see FIG. 4) corresponding to the edging configuration. In one embodiment, the difference between the first position and the second position is approximately 180 degrees about the centerline of the extension tube 106. FIG. 4 illustrates the trimmer 100 of FIG. 1 as it would appear after handle assembly rotation, i.e., as it would appear in the edging configuration. The position of the operator's hands in the edging configuration is also clearly illustrated. As is evident in this view, the figure 8-shaped secondary handle 112 permits the operator to reposition the second hand thereon without readjusting the secondary handle position. That is, the operator merely moves the second hand to the second gripping portion 111b from the first gripping portion 111a. Advantageously, the trimmer 100 can be reconfigured between the trimming and edging configurations without actuation or disengagement of switches, locks, push-buttons or the like. Further, the trimmer 100 can be reconfigured without repositioning the secondary handle 112. Still further, reconfiguration of the trimmer 100 does not require operator interaction with, e.g., grasping of, the cutting unit assembly 102.

Having described the basic operating configurations of the trimmer 100, attention is now directed to exemplary embodiments of the coupling mechanism 200.

Figure 5:
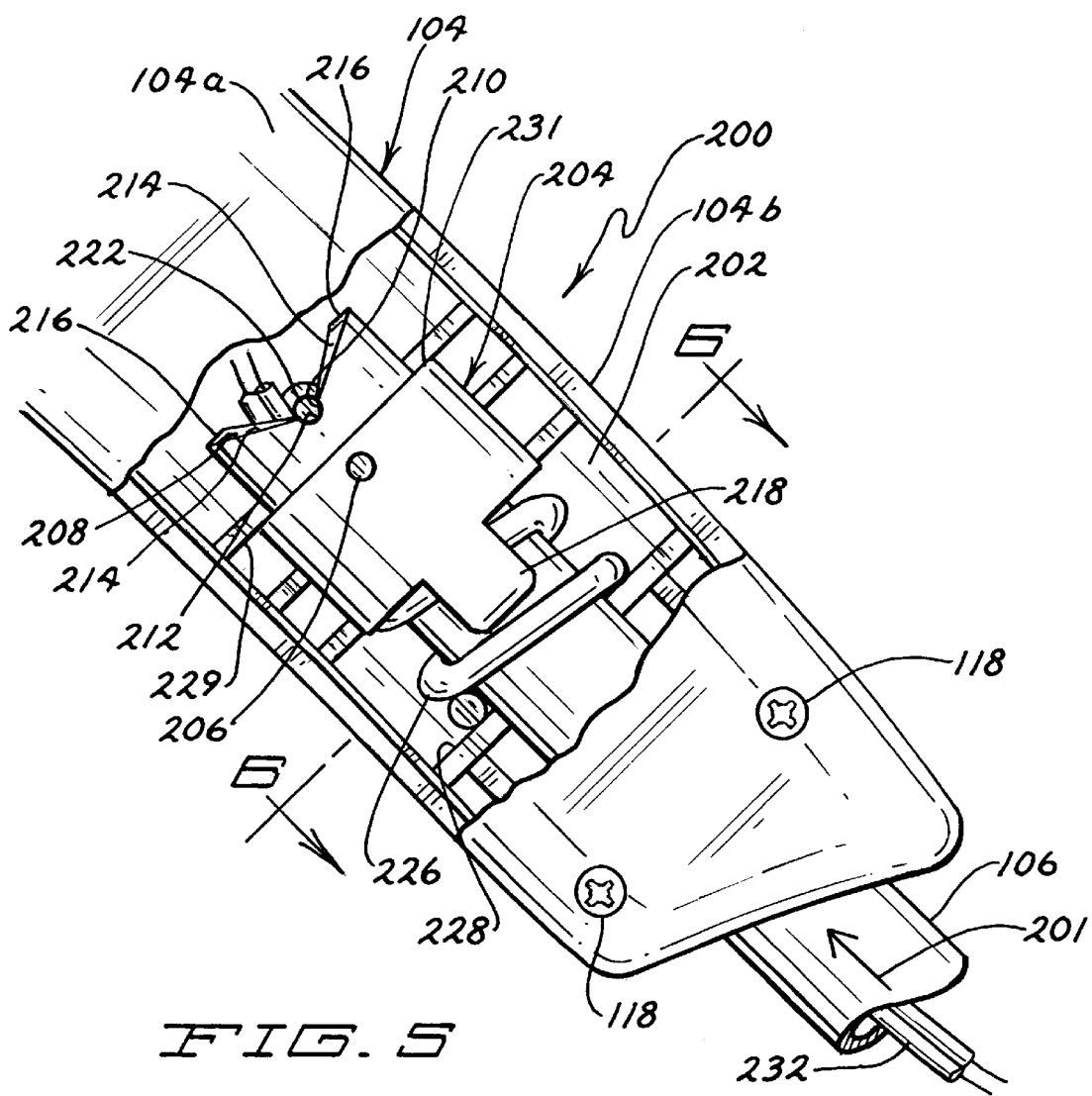
FIG. 5 is an enlarged cut-away view showing a coupling mechanism in accordance with one exemplary embodiment of the invention.

FIGS. 5–9 clearly illustrate the coupling mechanism 200. One purpose of the coupling mechanism is to permit the desired manipulation of the trimmer 100 between the trimming and edging configurations. Referring first to FIG. 5, a cut-away view of the handle assembly 104 showing the coupling mechanism 200 contained therein is provided. To physically accommodate and retain the mechanism 200, the handle assembly 104 includes a cavity 202. In the illustrated embodiment, the cavity 202 is defined by the hollow created when two plastic halves 104a (shown cut-away) and 104b are assembled. The handle halves 104a and 104b are preferably secured to one another via fastening elements, e.g., a fastener 118. Other fastening elements, e.g., snap-fits, adhesives, ultrasonic welds, etc. are also possible. When secured, the halves 104a and 104b form the unitary handle assembly 104 illustrated in the accompanying figures.

Figure 7:
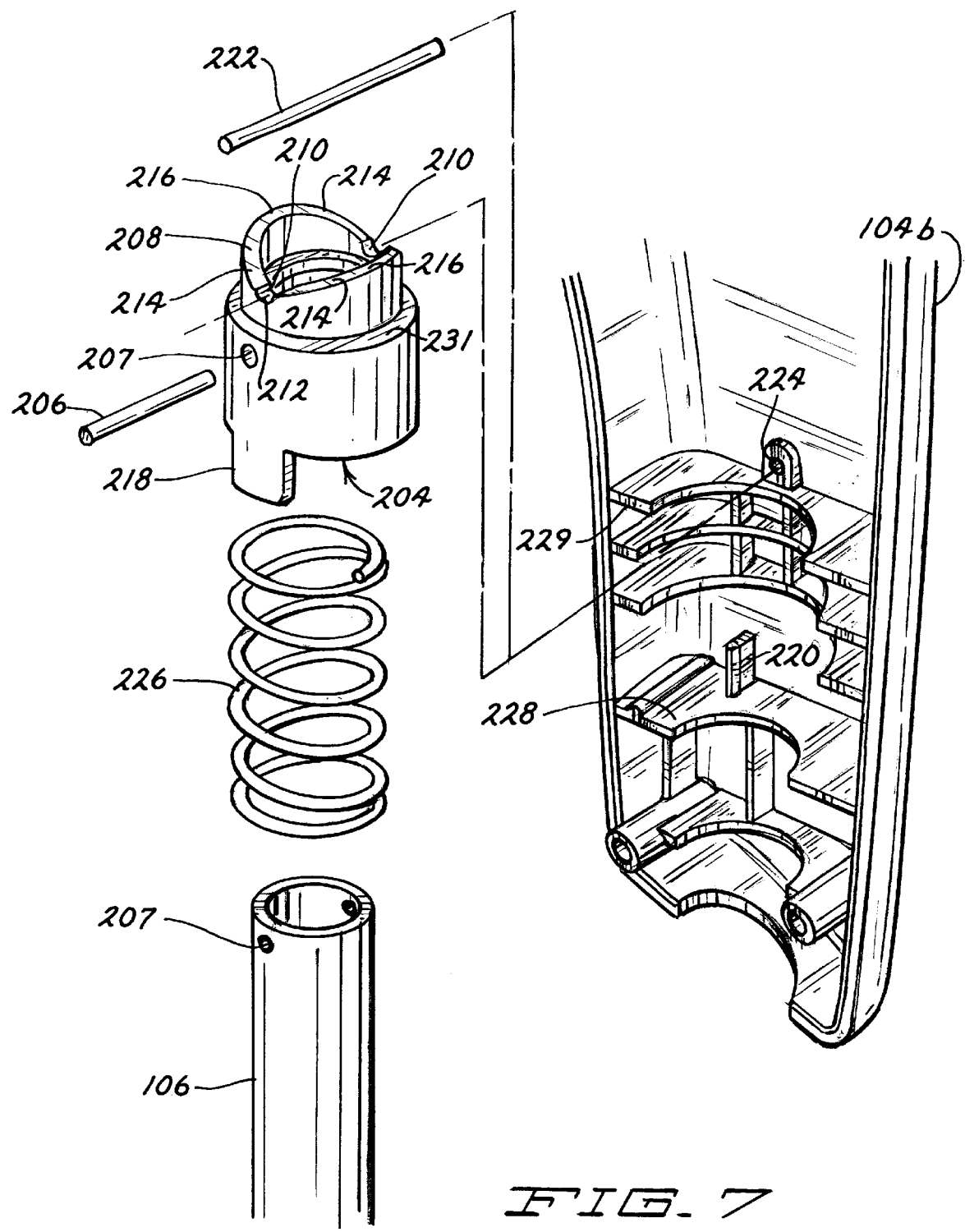
FIG. 7 is a partial exploded view of the coupling mechanism of FIG. 5.

The coupling mechanism 200, in one embodiment, may include a cam member 204 coupled to the end of the extension tube 106. As illustrated in FIGS. 5 and 7, the cam member 204 may be secured to the extension tube 106 with a mounting dowel pin 206 preferably made from steel or another high strength material. The dowel pin 206 passes through aligned receiving holes 207 (see FIG. 7) in both the cam member 204 and the extension tube 106. Preferably, the receiving holes 207 in either the cam member 204 or the extension tube 106 engage the pin 206 in an interference fit, thereby retaining the pin 206 therein. With the pin 206 securely in place, the cam member 204 is substantially coupled to the end of the extension tube 106.

While the cam member is described as coupled to the extension tube 106 with a dowel pin 206, other ways of attaching the two components are also possible. For example, arrangements wherein the cam member 204/pin 206 are retained by other techniques, e.g., threaded engagement, cotter pin, weld, etc., are also possible. For instance, the cam member 204 may be integrally formed on the end of the extension tube 106, i.e., the tube 106 and the cam member 204 may form a unitary component. Because the actual attachment of the cam member 204 to the extension tube 106 is not critical to the invention, most any other method of securing the components will also suffice.

Figure 9:
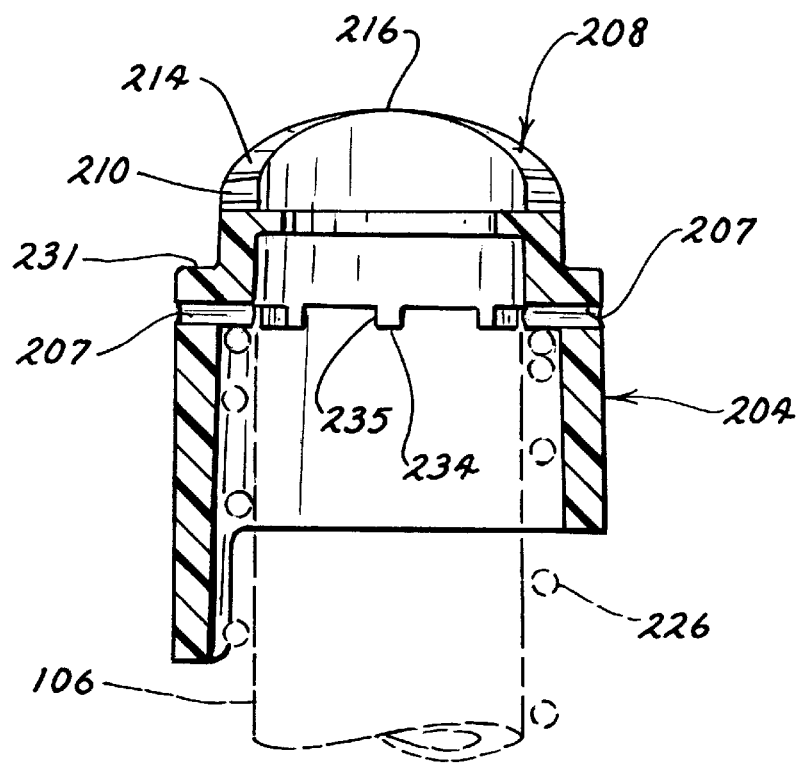
FIG. 9 is a section view taken along line 9—9 of FIG. 8.

Referring to FIGS. 5, 7, and 9, the outer end or face of the cam member 204 defines a cam surface 208. The term "cam surface" is used herein to refer to a typically non-planar surface that imparts variable motion (i.e., camming action) to, or receives such motion from, a member brought into contact, e.g., sliding or rolling contact, therewith. In one embodiment, the cam member 204 is configured as a generally cylindrical element as shown in FIG. 7 with the desired cam surface 208 formed on the end. While the actual profile of the cam surface 208 may be selected to provide the desired camming action, it may, in one embodiment, be partly defined by two diametrically opposing notches 210. The notches 210 generally form a pocket that conforms to the shape of a cam follower 222 described below. The notches 210, for purposes of explanation only, will be characterized as defining a lowermost cam surface 212. Spanning between the notches 210 are ramp portions 214. The ramp portions 214 extend along the circumferential cam surface 208 away from the lowermost surface 212. Adjoining ramp portions 214 intersect to form an uppermost surface 216 which is located about 90 degrees from the lowermost surface 212. The transition between adjoining ramp portions 214 may be smooth and continuous as shown in FIGS. 7 and 9. However, other embodiments may utilize a cam surface 208 having discontinuous and/or erratic shapes depending on the desired camming action. In the embodiment illustrated in FIG. 5, each ramp portion 214 extends from the notch 210 (which defines the lowermost surface 212) to the uppermost surface 216 for a total longitudinal displacement, e.g., total linear distance in the longitudinal direction 201 (see FIG. 5) of about 0.20 inches to about 0.50 inches. However, the actual shape and proportions of the cam surface 208 may be selected to provide most any camming action.

Figure 6:
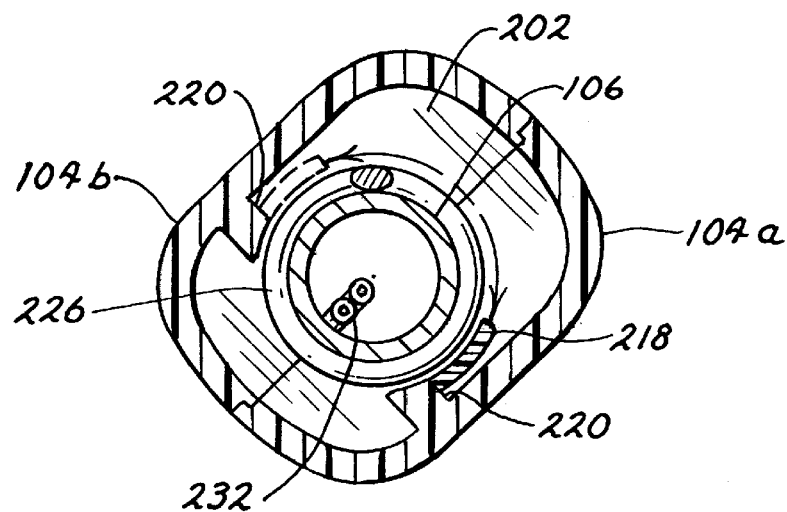
FIG. 6 is a section view taken along line 6—6 of FIG. 5.

The cam member 204 may further include a stop member, e.g., protrusion, 218 which, in one embodiment, extends from the end of the cam member 204 opposite the cam surface 208 (see FIG. 7). FIG. 6 illustrates how the stop member 218 communicates with one or more stop members, e.g., protrusions, 220 formed in the cavity 202. During operation, the stop members define the range of rotation of the handle assembly 104 relative to the extension tube 106, i.e., the stop members 220 define the arc over which the stop member 218, and thus the cam member 204, may pivot. In embodiments having an electrical cord 232 (see FIGS. 5 and 6), the stops 218, 220 also further prevent excessive twisting of the cord.

The cam follower, e.g., cylindrical pin 222, is illustrated in FIGS. 5 and 7. FIG. 7 shows the pin 222 prior to being pressed into a receiving aperture 224 on the half 104b and a similar receiving aperture on the half 104a (not shown). When the two halves 104a and 104b are secured, the pin 222 is held rigidly therebetween such that it spans laterally across the cavity 202 as generally indicated in FIG. 5.

While the exact materials used to form the pin 222 and the cam member 204 are not critical, they are preferably selected to provide adequate wear and corrosion resistance and to further avoid galling of the contact surfaces. In one embodiment, the pin 222 is made from steel and the cam member 204 is made from nylon. However, other materials are certainly possible within the scope of the invention. Furthermore, lubricants, e.g., dry films or other surface coatings, can be applied to reduce the frictional forces resulting from contact between the pin 222 and the cam surface 208.

The illustrated embodiments of the invention may further include a biasing member, e.g., compression spring 226, also shown in FIGS. 5 and 7. The spring 226 provides a longitudinal biasing force, e.g., spring force, to the cam member 204 to maintain the cam member and the pin 222 in contact throughout trimmer operation. In the illustrated embodiments, the spring 226 surrounds the extension tube 106 and rests against a shoulder 234 (see FIG. 9) located on the inner diameter of the cam member 204. The opposite end of the spring 226 loads against a seat 228 formed within the cavity 202 (see FIGS. 5 and 7). Preferably, the seat 228 is configured as an integral feature of one or both halves 104*a*, 104*b*. However, embodiments wherein the seat 228 is a separate component that is received and held within the cavity 202 are also possible. A rib 229 may further be provided to retain a lip 231 of the cam member 204 as shown in FIGS. 5 and 7.

Figure 8:
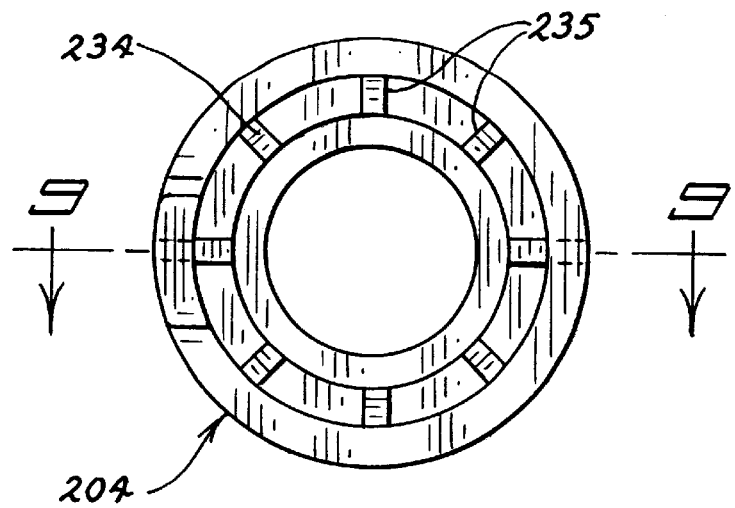
FIG. 8 is a bottom view of the cam member of FIG. 5 as viewed along the longitudinal axis of the cam member.

FIGS. 8 and 9 illustrate one embodiment of the cam member 204 in more detail. FIG. 8 illustrates an end view of the cam member 204 while FIG. 9 shows a section view. The shoulder 234 on which the spring 226 contacts may form a series of teeth 235. The teeth 235 also define guides for locating the extension tube 106. FIG. 9 further illustrates the cam surface 208 including the uppermost portion 216 and the ramp portions 214. The notches 210 are also partially visible in this view as are the receiving holes 207 for receiving the mounting dowel pin 206 (see FIG. 7).

The compression spring 226 is selected to provide the desired longitudinal biasing force to the cam member 204 against the cam follower 222. Due to the camming action of the cam surface 208, the longitudinal biasing force produces a corresponding rotational biasing force to the handle assembly 104 relative to the extension tube 106 when the cam member 204 is rotated relative to the cam follower 222. The spring 226 may be selected so that the longitudinal force applied to the cam member 204, and thus the rotational biasing force that tends to maintain the trimmer 100 in either the trimming or edging configuration, can be controlled. In one embodiment, the spring 226 imparts a longitudinal force of about 5 lbs to about 10 lbs to the cam member 204 when the cam follower 222 is located within the notches 210, i.e., when the trimmer is in either the trimming or edging configuration (see FIG. 5). When the handle assembly is rotated 90 degrees so that the pin 222 is proximate the uppermost surface 216, the spring is compressed about 0.20 inches to about 0.50 inches (relative to when the pin 222 is in the notch 210), generating a longitudinal force of about 10 lbs to about 20 lbs to the cam member 204. Of course, the actual spring force is dependent upon many factors including compliance of the supporting structure, tolerances, alignment, etc.

When the trimmer 100 is in the trimming configuration as generally represented in FIG. 1, the handle assembly 104 is positioned relative to the extension tube 106 such that the pin 222 rests within the notches 210 as generally shown in FIG. 5. When the pin 222 is located within the notches 210, the trimmer 100 is substantially retained in either the trimming or edging configuration. That is, the shape of the notches 210 and ramp portions 214, coupled with the force produced by the spring 226, tends to retain the pin 222 within the notches such that the handle assembly 104 does not rotate relative to the extension tube 106 during normal operation. Even if an inadvertent, momentary rotational force cause the pin 222 to rise out of the notches 210, the camming action of the ramp portions 214 tends to bias the pin 222 back towards the notches. In some embodiments, the biasing force alone may return the pin 222 to the notches 210. In other embodiments, factors such as limited spring force and/or friction between the pin 222 and the cam surface 208 may necessitate operator assistance in returning the trimmer 100 to the desired configuration.

When operating in the trimming configuration, the operator typically has one hand on the handle assembly 104 and one hand on the first gripping portion 111*a* of the secondary handle 112 as generally shown in FIG. 1. When the operator wishes to switch the trimmer to the edging configuration, a twisting force in the direction 114 (see FIG. 3) may be imparted to the handle assembly 104 relative to the extension tube 106, e.g., the operator grips the extension tube 106 and twists or rotates the handle assembly 104 relative thereto, about the centerline of the extension tube 106. As previously stated, where the secondary handle 112 is securely clamped to the extension tube 106, the twisting force may also be applied by twisting the secondary handle 112 relative to the handle assembly 104, e.g., the operator grips the secondary handle 112 and twists or rotates the handle assembly 104 relative thereto about the centerline of the extension tube 106. In general, any sufficient twisting force applied between the handle assembly 104 and the extension tube 106 will permit movement of the trimmer between the two configurations.

As the twisting force is imparted (see FIG. 2), the cylindrical portion of the pin 222 rides against the ramp portions 214 of the cam surface 208 (see FIG. 5). When the twisting force is sufficient to overcome the longitudinal spring force applied between the pin 222 and the cam surface 208, the spring 226 begins to compress. As the spring compresses, the pin 222 rides up out the notches 210 and along the ramp portions 214. As the handle assembly 104 continues to rotate, the spring continues to compress. If the twisting force is released, the biasing force of the spring tends to assist the pin 222 back along the ramp portions 214 to the notches 210. However, if the handle assembly 104 is rotated until the pin 222 traverses the uppermost portion 216 of the cam surface, i.e., beyond 90 degrees, the biasing force of the spring 226 tends to assist the pin 222 down the opposite ramp portions 214 and back into the notches 210. That is, once the pin 222 passes the uppermost portion 216 of the cam surface, the spring tends to bias the trimmer towards the edging configuration (see FIG. 4). In the edging configuration, the pin 222 is once again located within the notches 210 but is indexed about 180 degrees from its trimming configuration.

In embodiments where more positive retainment of the trimmer is desired, the cam member 204 may be designed with deeper notches 210, e.g., the notches may be recessed deeper into the cam member 204. By providing deeper notches, the twisting force necessary to rotate the handle assembly 104 relative to the extension tube 106 increases. If the notch becomes sufficiently deep, it may be necessary to impart a longitudinal force, e.g., in the direction 118 (see FIG. 2), between the handle assembly 104 and the extension tube 106 before or during application of the twisting force. Such a longitudinal force may also be applied when using any of the other embodiments described herein to reduce the necessary twisting force. More positive retainment may also be achieved through other changes such as increasing the slope of the ramp portions 214 or selecting a spring 226 having a greater spring force.

Advantageously, The present invention provides a vegetation trimmer that may be conveniently manipulated between a trimming configuration and an edging configuration. The trimmer may be manipulated between these configurations by application of one or more forces including a twisting force and a longitudinal force. By providing a coupling mechanism as described herein, positive mechanical index releases, e.g., clamps, levers, and buttons, are not required. Trimmers according to the present invention further provide a biasing force that tends to both assist the trimmer towards and substantially retain the trimmer in either the trimming or edging configuration.

Exemplary embodiments of the present invention are described above. Those skilled in the art will recognize that many embodiments are possible within the scope of the invention. For instance, the coupling mechanism 200 could be inverted, e.g., the cam member 204 could be coupled to the handle assembly 104 and the cam follower 222 could be coupled to the extension tube 106. Other variations, modifications, and combinations of the various parts and assemblies can certainly be made and still fall within the scope of the invention. Thus, the invention is limited only by the following claims, and equivalents thereto.

What is claimed is:

1. A method for reconfiguring a vegetation trimmer between a trimming configuration and an edging configuration, the method comprising:
    providing a vegetation trimmer comprising:
        cutting unit assembly;
        a handle assembly;
        an extension tube having a first end coupled to the handle assembly and a second end coupled to the cutting unit assembly; and
        a coupling mechanism for coupling the first end of the extension tube to the handle assembly, wherein the coupling mechanism is adapted to rotationally bias the handle assembly relative to the extension tube to either a first position or a second position, the first position corresponding to the trimming configuration and the second position corresponding to the edging configuration; and
    applying a twisting force between the handle assembly and the extension tube whereby the handle assembly rotates about the extension tube between the first position and the second position, wherein rotation of the handle assembly about the extension tube results in longitudinal displacement of substantially all of the handle assembly relative to the extension tube.

2. A vegetation trimmer, comprising:
    a cutting unit assembly;
    a handle assembly;
    an extension tube having a first end coupled to the handle assembly and a second end coupled to the cutting unit assembly; and
    a coupling mechanism operable to permit rotation of the handle assembly relative to the cutting unit assembly toward either a first position or a second position, the first position corresponding to a trimming configuration of the vegetation trimmer and the second position corresponding to an edging configuration of the vegetation trimmer; wherein the coupling mechanism is operable to rotationally bias the handle assembly relative to the cutting unit assembly toward either the first position or the second position when the handle assembly is at substantially any position between the first position and the second position.

3. The vegetation trimmer of claim 2, wherein the handle assembly, when in the first position, is rotated about 180° from the handle assembly when in the second position.

4. The vegetation trimmer of claim 2, wherein the coupling mechanism further comprises:
    a cam member, the cam member defining a cam surface;
    a cam follower for moving along the cam surface; and
    a biasing member for biasing the cam surface against the cam follower.

5. The vegetation trimmer of claim 4, wherein the cam member is coupled to the first end of the extension tube and the cam follower is coupled to the handle assembly.

6. The vegetation trimmer of claim 4, wherein the cam follower is a cylindrical pin which engages the cam surface along a cylindrical portion of the cylindrical pin.

7. The vegetation trimmer of claim 4, wherein the cam surface comprises diametrically opposed notches, wherein the vegetation trimmer is selectively and substantially retained in either the trimming or edging configuration by the engagement of the cam follower within the diametrically opposed notches.

8. The vegetation trimmer of claim 4, further comprising one or more stops to limit rotation of the handle assembly relative to the cutting unit assembly between the trimming configuration and the edging configuration.

9. The vegetation trimmer of claim 8, wherein the one or more stops comprise one or more first stops coupled to the cam member and one or more second stops coupled to the handle assembly.

10. The vegetation trimmer of claim 2, wherein the handle assembly is adapted to receive a first hand of an operator and wherein the vegetation trimmer further comprises a secondary handle adapted to receive a second hand of the operator, the secondary handle coupled to the extension tube such that the operator alone may move the vegetation trimmer between the trimming configuration and the edging configuration while gripping the handle assembly and the secondary handle.

11. The vegetation trimmer of claim 2, further comprising a secondary handle operable for clamping to the extension tube, wherein the secondary handle has a first gripping portion for gripping when the vegetation trimmer is in the trimming configuration and a second gripping portion for gripping when the vegetation trimmer is in the edging configuration.

12. A vegetation trimmer operable for use in either a trimming configuration or an edging configuration, the vegetation trimmer comprising:
    a cutting unit assembly;
    a handle assembly;
    an extension tube having a first end coupled to the handle assembly and a second end coupled to the cutting unit assembly; and
    a coupling mechanism for coupling the first end of the extension tube to the handle assembly, wherein the coupling mechanism comprises:
        a cam member located at the first end of the extension tube, the cam member defining a cam surface, wherein the first end of the extension tube does not extend longitudinally beyond the cam surface;
        a cam follower coupled to the handle assembly; and
        a biasing member for biasing the cam surface against the cam follower;
    wherein the coupling mechanism is adapted to allow the handle assembly to be selectively rotated relative to the extension tube by application of at least a twisting force.

13. The vegetation trimmer of claim 12, wherein the cam member is cylindrical in shape and the cam surface is formed along a first longitudinal end of the cam member.

14. The vegetation trimmer of claim 13, wherein the cam surface comprises diametrically opposed notches, the notches adapted to selectively and substantially retain the vegetation trimmer in either the trimming or edging configuration when the cam follower is engaged with the notches.

15. The vegetation trimmer of claim 14, wherein the cam surface further comprises ramp portions spanning between the notches, and wherein uppermost portions of the cam surface are defined at the intersection of adjoining ramp portions.

16. The vegetation trimmer of claim 12, wherein the biasing member is a compression spring.

17. The vegetation trimmer of claim 12, wherein the handle assembly comprises a cavity to contain the coupling mechanism.

18. A method for reconfiguring a vegetation trimmer between a trimming configuration and an edging configuration, the method comprising:

provi ding a vegetation trimmer, comprising:
   a cutting unit assembly;
   a handle assembly;
   an extension tube having a first end coupled to the handle assembly and a second end coupled to the cutting unit assembly; and
   a coupling mechanism operable to permit rotation of the handle assembly relative to the cutting unit assembly toward either a first position or a second position, the first position corresponding to a trimming configuration of the vegetation trimmer and the second position corresponding to an edging configuration of the vegetation trimmer;
   wherein the coupling mechanism is operable to rotationally bias the handle assembly relative to the cutting unit assembly toward either the first position or the second position when the handle assembly is at substantially any position between the first position and the second position; and applying a twisting force between the handle assembly and the extension tube whereby the handle assembly rotates about the extension tube between the first position and the second position.

19. The method of claim 18, further comprising engaging a cam follower of the coupling mechanism with a notch in a cam surface of the coupling mechanism, thereby substantially retaining the vegetation trimmer in either the trimming or edging configuration.

20. The method of claim 18, further comprising longitudinally displacing the handle assembly relative to the extension tube before application of the twisting force.

21. The method of claim 18, further comprising longitudinally displacing the handle assembly relative to the extension tube during application of the twisting force.

22. A vegetation trimmer, comprising:

a cutting unit assembly;

a handle assembly;

an extension tube having a first end coupled to the handle assembly and a second end coupled to the cutting unit assembly;

a secondary handle operable to clamp to the extension tube; and a coupling mechanism operable to permit rotation of the handle assembly relative to the cutting unit assembly toward either a first position or a second position, the first position corresponding to a trimming configuration of the vegetation trimmer and the second position corresponding to an edging configuration of the vegetation trimmer;

wherein the coupling mechanism is operable to rotationally bias the handle assembly relative to the cutting unit assembly toward either the first position or the second position when the handle assembly is at substantially any position between the first position and the second position.

* * * * *